(12) United States Patent
Ou Yang et al.

(10) Patent No.: US 11,662,254 B2
(45) Date of Patent: May 30, 2023

(54) TEMPERATURE DETECTING DEVICE

(71) Applicant: AViTA Corporation, New Taipei (TW)

(72) Inventors: Hsing Ou Yang, New Taipei (TW);
Hsuan-Hao Shih, New Taipei (TW);
Ta-Chieh Yang, New Taipei (TW)

(73) Assignee: AViTA Corporation, New Taipei (TW)

( * ) Notice: Subject to any disclaimer, the term of this patent is extended or adjusted under 35 U.S.C. 154(b) by 105 days.

(21) Appl. No.: 17/325,227

(22) Filed: May 20, 2021

(65) Prior Publication Data

US 2021/0381903 A1  Dec. 9, 2021

(30) Foreign Application Priority Data

Jun. 3, 2020  (TW) .................... 109118635

(51) Int. Cl.
| | |
|---|---|
| *G01K 3/02* | (2006.01) |
| *G01K 1/022* | (2021.01) |
| *G01K 1/024* | (2021.01) |
| *G01K 1/02* | (2021.01) |

(52) U.S. Cl.
CPC ............ *G01K 3/02* (2013.01); *G01K 1/022* (2013.01); *G01K 1/024* (2013.01); *G01K 1/026* (2013.01); *G01K 1/028* (2013.01)

(58) Field of Classification Search
USPC ................................................ 374/186, 121
See application file for complete search history.

(56) References Cited

U.S. PATENT DOCUMENTS

| | | | |
|---|---|---|---|
| 2014/0350362 A1 | 11/2014 | Raptis et al. | |
| 2015/0185082 A1* | 7/2015 | Aberra | G01K 7/01 374/170 |

FOREIGN PATENT DOCUMENTS

| | | | | |
|---|---|---|---|---|
| CN | 106092341 A | * | 11/2016 | ............... G01K 1/00 |
| CN | 106175711 | | 12/2016 | |
| CN | 111588354 A | * | 8/2020 | |
| CN | 111488337 B | * | 8/2021 | ............ G01J 5/0025 |
| CN | 113598837 A | * | 11/2021 | |
| EP | 1519172 | | 3/2005 | |
| JP | 8327403 | | 12/1996 | |
| TW | 201610401 | | 3/2016 | |
| WO | WO2011053526 | | 5/2011 | |

* cited by examiner

*Primary Examiner* — Mirellys Jagan
(74) *Attorney, Agent, or Firm* — Che-Yang Chen; Law Office of Michael Chen (57) ABSTRACT

A thermometer includes an input unit, a control unit, a temperature sensor and an output unit. In response to an input operation is applied on the input unit, the control unit starts to perform a temperature detecting procedure, wherein the control unit instructs the temperature sensor to periodically perform a plurality of temperature detecting operations to obtain a plurality of detected temperature values corresponding to the temperature detecting operations, and only records X largest valid temperature values among the obtained temperature values. In response to determining that the performed temperature to detecting procedure is completed, the control unit removes the largest one among the recorded valid temperature values and calculates an average value of the remaining one or more target temperature values as a temperature of a target object, so as to instruct the output unit display the temperature.

10 Claims, 5 Drawing Sheets

TEMPERATURE DETECTING DEVICE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The invention relates to a temperature detecting device (also called as a temperature gun or a thermometer, etc.).

Description of Related Arts

Traditionally, general thermometers (e.g., a frontal temperature gun) have been used to measure the temperature of a target object (e.g., the subject's forehead) without removing extreme temperature values. This distorts the temperature of the final object displayed.

SUMMARY OF THE PRESENT INVENTION

The present invention provides a temperature detecting device, which can avoid the temperature distortion caused by extreme temperature, and thus improve the accuracy of the final temperature of the target object.

The present invention provides a temperature detecting device for measuring the temperature of a target object. The temperature detecting device includes a temperature sensor, an input unit, an output unit and a control unit. In response to an input operation being applied on the input unit, the control unit starts to perform a temperature detecting procedure, wherein the control unit instructs the temperature sensor to periodically perform a plurality of temperature detecting operations to obtain a plurality of detected temperature values corresponding to the plurality of temperature detecting operations, wherein the control unit only records a plurality of valid temperature values among the obtained temperature values, wherein the valid temperature values are larger than other temperature values in the obtained temperature values, wherein a total amount of the valid temperature values is less than or equal to X, and X is predetermined as an integer greater than 2. Furthermore, the control unit determines whether the performed temperature detecting procedure is completed, wherein, in response to determining that the temperature detecting procedure has been completed, the control unit identifies the recorded plurality of valid temperature values, wherein the control unit removes the largest of the recorded plurality of valid temperature values to obtain remaining one or more target temperature values, wherein the control unit calculates an average value according to the one or more target temperature values to serve as the temperature of the target object, so as to instruct the output unit to display the temperature.

In an embodiment of the invention, wherein in response to determining that the temperature detecting procedure is not completed, the control unit instructs the output unit to display a prompt message to prompt a user to move the temperature detecting device to close to the target object, and then measure the temperature at different positions on the target object.

In an embodiment of the invention, wherein the temperature sensor is an infrared temperature sensor.

In an embodiment of the invention, wherein the control unit empties all recorded temperature values after displaying the temperature.

In an embodiment of the invention, wherein in the operation of determining whether the performed temperature detecting procedure is complete, the control unit determines whether a total amount of the plurality of the detected temperature values is smaller than N, wherein N is predetermined as a positive integer greater than or equal to X, wherein in response to determining that the total amount of the detected temperature values is not smaller than N, the control unit determines that the performed temperature detecting procedure has been completed, wherein in response to determining that the total amount of the detected temperature values is smaller than N, the control unit determines that the performed temperature detecting procedure has not been completed. Or, the control unit determines whether the input operation is stopped, wherein in response to determining that the input operation is stopped, the control unit determines that the performed temperature detecting procedure has been completed, wherein in response to determining that the input operation is not stopped, the control unit determines that the performed temperature detecting procedure has not been completed.

In an embodiment of the invention, wherein in the operation of only recording the valid temperature values of the obtained detected temperature values, each time when the control unit obtains one detected temperature value, the control unit updates the recorded valid temperature values by comparing the one detected temperature value with the recorded valid temperature values.

In an embodiment of the invention, wherein in the operation of updating the recorded valid temperature values by comparing the one detected temperature value with the recorded valid temperature values, in response to determining that the total amount of the plurality of valid temperature values is smaller than X, the control unit directly records the one detected temperature value as one of the valid temperature values to update the plurality of valid temperature values; and in response to determining that the total amount of the plurality of valid temperature values is equal to X, the control unit determines whether the one detected temperature value is greater than one of the valid temperature values, wherein in response to determining that the one detected temperature value is greater than the one of the valid temperature values, the control unit removes a minimum among the valid temperature values and records the one detected temperature value as one of the valid temperature values, so as to update the valid temperature values, wherein X indicates a upper limit value of the total amount of the plurality of valid temperature values, and the plurality of valid temperature values indicates first X largest detected temperature values among all the detected temperature values.

In an embodiment of the invention, wherein in the operation of updating the recorded valid temperature values by comparing the one detected temperature value with the recorded valid temperature values, in response to determining that the one detected temperature value is not greater than all the valid temperature values, the control unit does not record the one detected temperature value as one of the valid temperature values.

In an embodiment of the invention, in the operation of determining whether the performed temperature detecting procedure is complete, the control unit determines that the temperature detecting procedure has been completed in response to the input unit receiving another input operation.

In an embodiment of the invention, wherein in response to determining that the performed temperature detecting procedure has been completed and the total amount of the plurality of valid temperature values is 2, the control unit directly takes the smaller among the plurality of valid temperature values that have been recorded as the temperature of the target object and instructs the output unit to display the temperature.

Based on the above, the temperature detecting device provided by the implement of the invention, is capable of, via a plurality of performed temperature detecting operations performed on a target object, obtaining a plurality of detected temperature values and recording a plurality of larger valid temperature values therein, removing the largest among the valid temperature values, and calculating an average of the remaining a plurality of target temperature values to be a temperature of the target object. In this way, the distortion caused by the extreme detected temperature values can be avoided, and then the accuracy of the obtained temperature of the target object is thus improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENT

Figure 1:
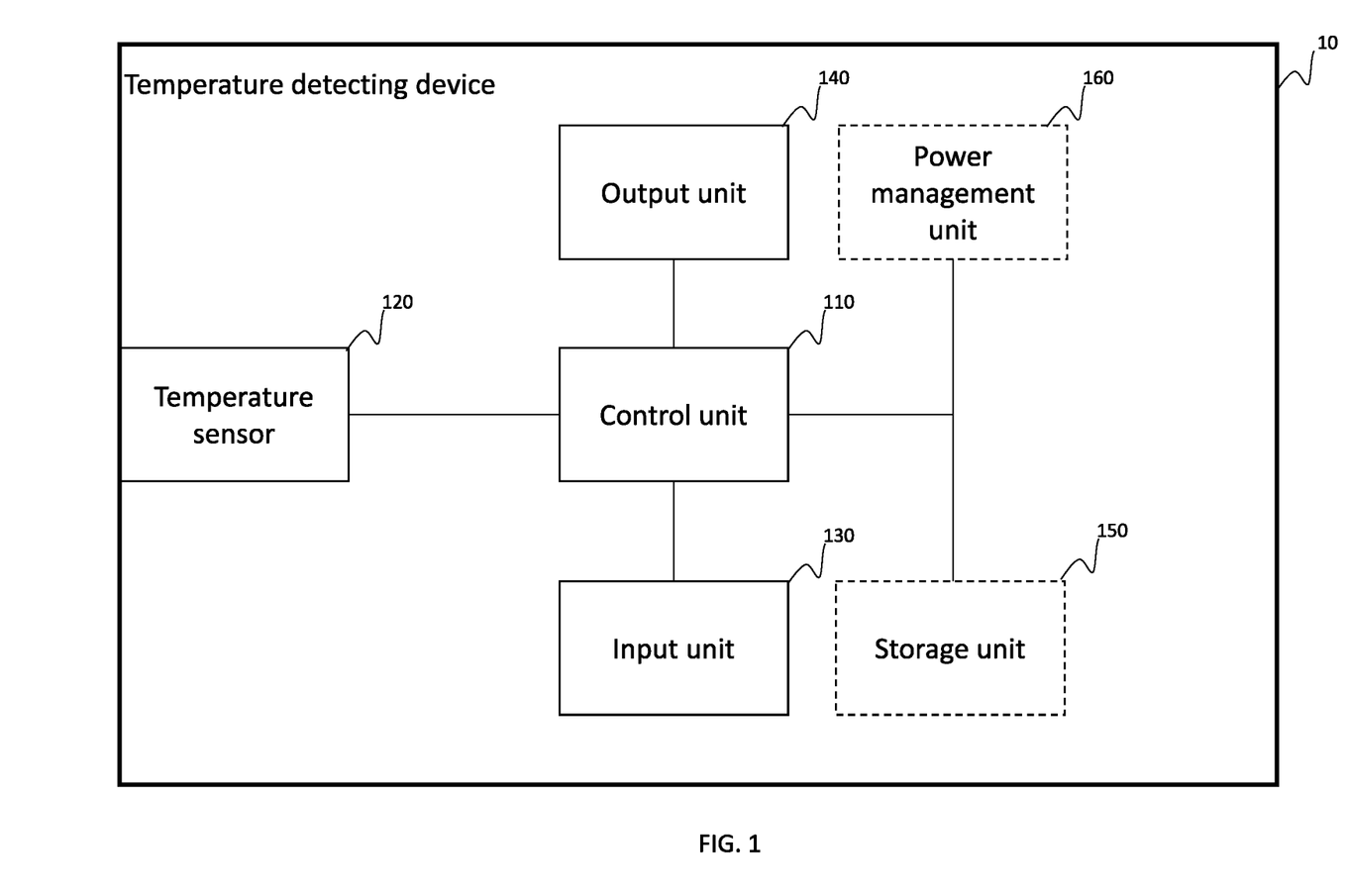
FIG. 1 is a schematic block diagram of a temperature detecting device illustrated according to an embodiment of the invention.
Figure 2A:
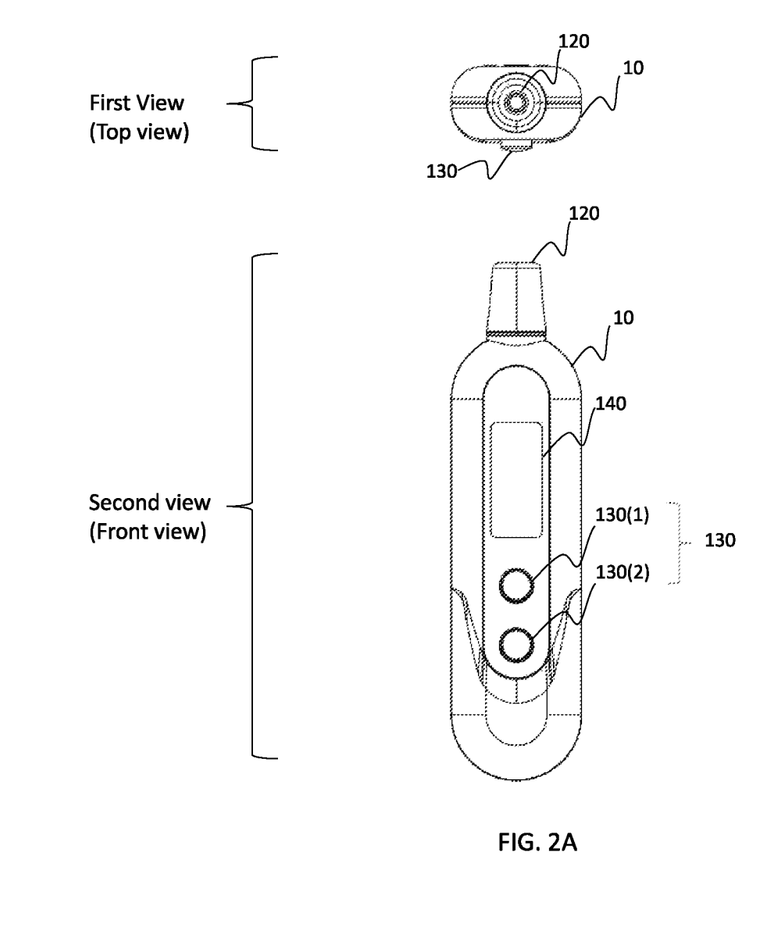
FIG. 2A is the first and second views of a temperature detecting device illustrated according to an embodiment of the invention.
Figure 2B:
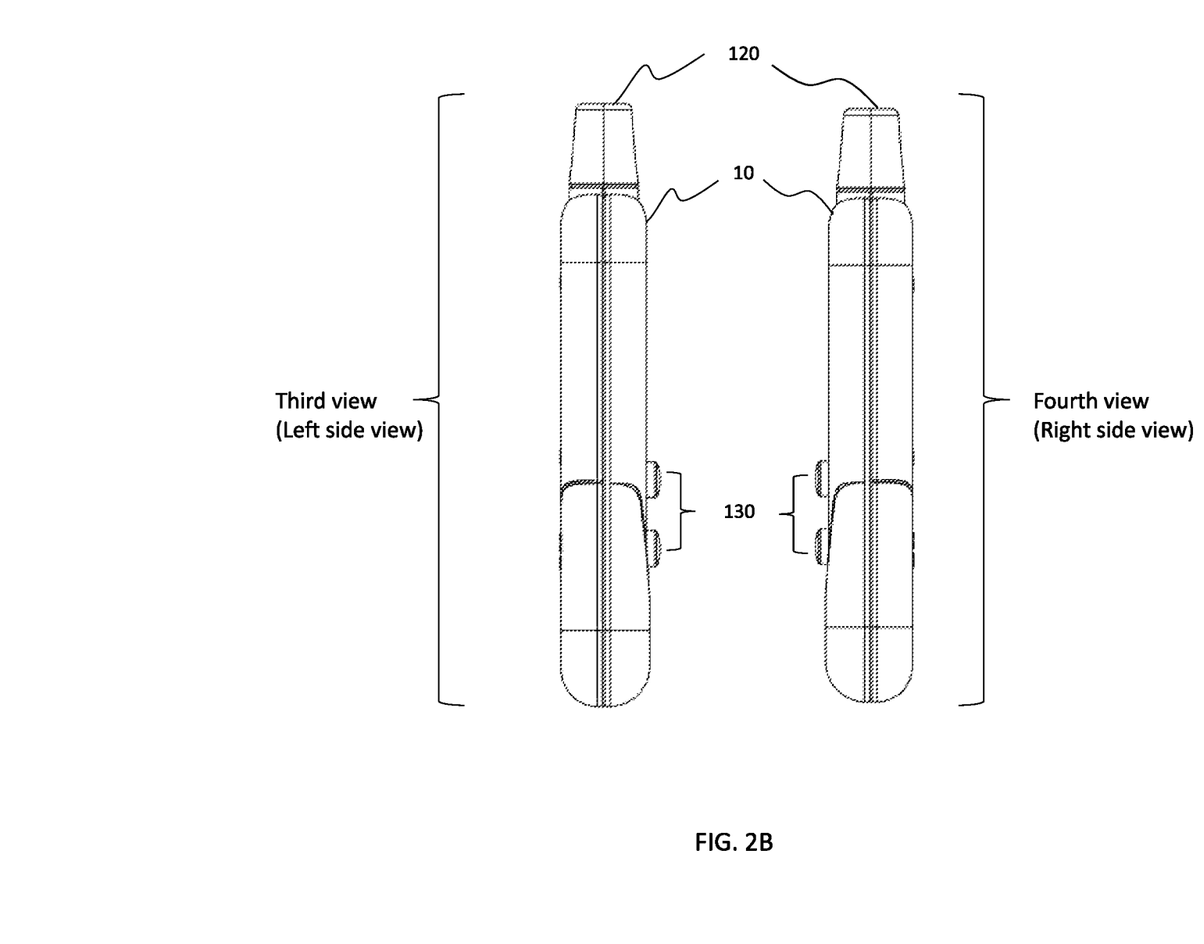
FIG. 2B is the third and fourth views of a temperature detecting device illustrated according to an embodiment of the invention.
Figure 2C:
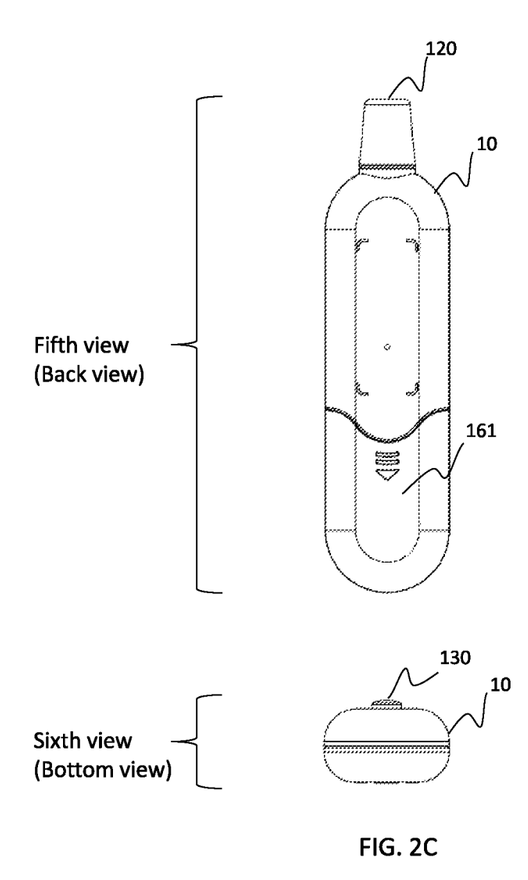
FIG. 2C is the fifth and sixth views of a temperature detecting device illustrated according to an embodiment of the invention.

FIG. 1 is a schematic block diagram of a temperature detecting device illustrated according to an embodiment of the invention. FIG. 2A is the first and second views of a temperature detecting device illustrated according to an embodiment of the invention. FIG. 2B is the third and fourth views of a temperature detecting device illustrated according to an embodiment of the invention. FIG. 2C is the fifth and sixth views of a temperature detecting device illustrated according to an embodiment of the invention.

Referring to FIG. 1 and FIGS. 2A to 2C at the same time. In the embodiment, the temperature detecting device (also called as temperature detecting unit, temperature measuring device, and thermometer, etc.) 10 includes a control unit 110, a temperature sensor 120, an input unit 130, and an output unit 140. The control unit 110 is coupled to the temperature sensor 120, the input unit 130 and the output unit 140. In another embodiment, the temperature detecting device 10 may further include a storage unit 150 coupled to the control unit 110 and a power management unit 160. In the embodiment, the temperature detecting device 10 is used to measure the surface temperature on a target object. For example, the temperature detecting device 10 may be a forehead temperature gun or an ear temperature gun, but the present invention is not limited hereto. The target object is, for example, a subject's forehead, ear canal or other skin surface. In addition, the target object can also be considered another physical object.

The control unit 110 is a hardware (e.g., a chip set, a processor, etc.) having computing ability, and the control 110 is configured to manages the overall operation of the temperature detecting device 10 and transmits different signals/instructions to the temperature sensor 120 to perform the temperature detecting operation. After each temperature detecting operation is completed, the temperature sensor 120 can transmit the corresponding temperature value to the control unit 110. The control unit 110 can temporarily store/record the received temperature value by itself, or the control unit 110 can store/record the received temperature value to the storage unit 150. In the embodiment, the control unit 110, for example, is a micro-processor, a digital signal processor (DSP), a programmable controller, an application specific integrated circuits (ASIC), a programmable logic device (PLD), or other similar devices.

The input unit 130 is coupled to the control unit 110, such as a physical key (for example, the first key 130(1) and the second key 130(2)), which is used to receive the input operations performed by the user (for example, pressing the physical key 130) to inform the control unit 110 to perform/execute the corresponding program(s).

For example, when the first button 130(1) is pressed, the first button 130(1) is triggered and generates a first signal, which is transmitted to the control unit 110 so that the control unit 110 starts to execute a temperature detecting procedure. When the first button 130(1) is pressed, the temperature detecting device 10 will be turned on (if the temperature detecting device 10 was turned off or in a sleep status) and the first button 130(1) will be triggered to generate the first signal.

For a further example, when the second key 130(2) is pressed, the second key 130(2) is triggered and generates a second signal, which is transmitted to the control unit 110 to stop the temperature detecting procedure (e.g., to determine that the temperature detecting procedure has been completed). In one embodiment, when the second key 130(2) is pressed for more than a predetermined period of time, the control unit 110 instructs the power management unit 160 to stop providing power to allow the temperature detecting device 10 to sleep/shut down.

The output unit 140 is, for example, a liquid crystal screen (which receives the commands/instructions of the control unit 110 to display the corresponding image/text content). In one embodiment, the input unit 130 can be further integrated with the output unit 140, for example, as a touch screen, which can display (output) data (e.g., images or text) and can receive the user's touch operation to trigger the corresponding program (e.g., a temperature detecting procedure).

The storage unit 150 is coupled to the control unit 110. The storage unit 150 is configured to store data. The storage unit 150 can be any type of non-volatile memory storage device. The data is, for example, a temperature value being detected or a software/firmware used to manage the temperature detecting device 10. In other embodiments, storage unit 150 may also be integrated into the control unit 110.

The power management unit 160 is used to manage the power of the temperature detecting device 10. For example, when the temperature detecting device 10 is idle for another predetermined period of time, the power management unit 160 may stop providing power to the temperature detecting device 10 to allow the temperature detecting device 10 to enter the shutdown/sleep status. As mentioned above, if the temperature detecting device 10 is in the power-off/sleep status, when the first button 130(1) is pressed, the power management unit 160 can be triggered to provide power to the temperature detecting device 10. The power management unit 160 is, for example, a circuit unit that can be equipped with a battery to provide power for the overall operation of the temperature detecting device 10 by the power of the battery.

In the embodiment, the temperature sensor 120 is used to receive instructions from the control unit 110 to perform the corresponding temperature detecting operation. More specifically, the temperature sensor 120, for example, is an infrared temperature sensor, which is a non-contact temperature sensor. By collecting the infrared energy emitted by the temperature of the target object, the corresponding temperature value can be calculated by converting the wavelength to the temperature.

As shown in FIG. 2A, the temperature sensor 120 can be arranged on the upper surface of the temperature detecting device 10; The input unit 130 and the output unit 140 can be arranged on the front surface of the temperature detecting device 10; The control unit 110, the storage unit 150, and the power management unit 160 can be arranged inside the temperature detecting device 10. In addition, as shown in FIG. 2C, a battery backplane 161 is provided on the rear surface of the temperature detecting device 10 to cover the chamber containing the battery. The user can install or remove the battery by opening the battery backplane 161 with the image indication on the battery backplane.

Figure 3:
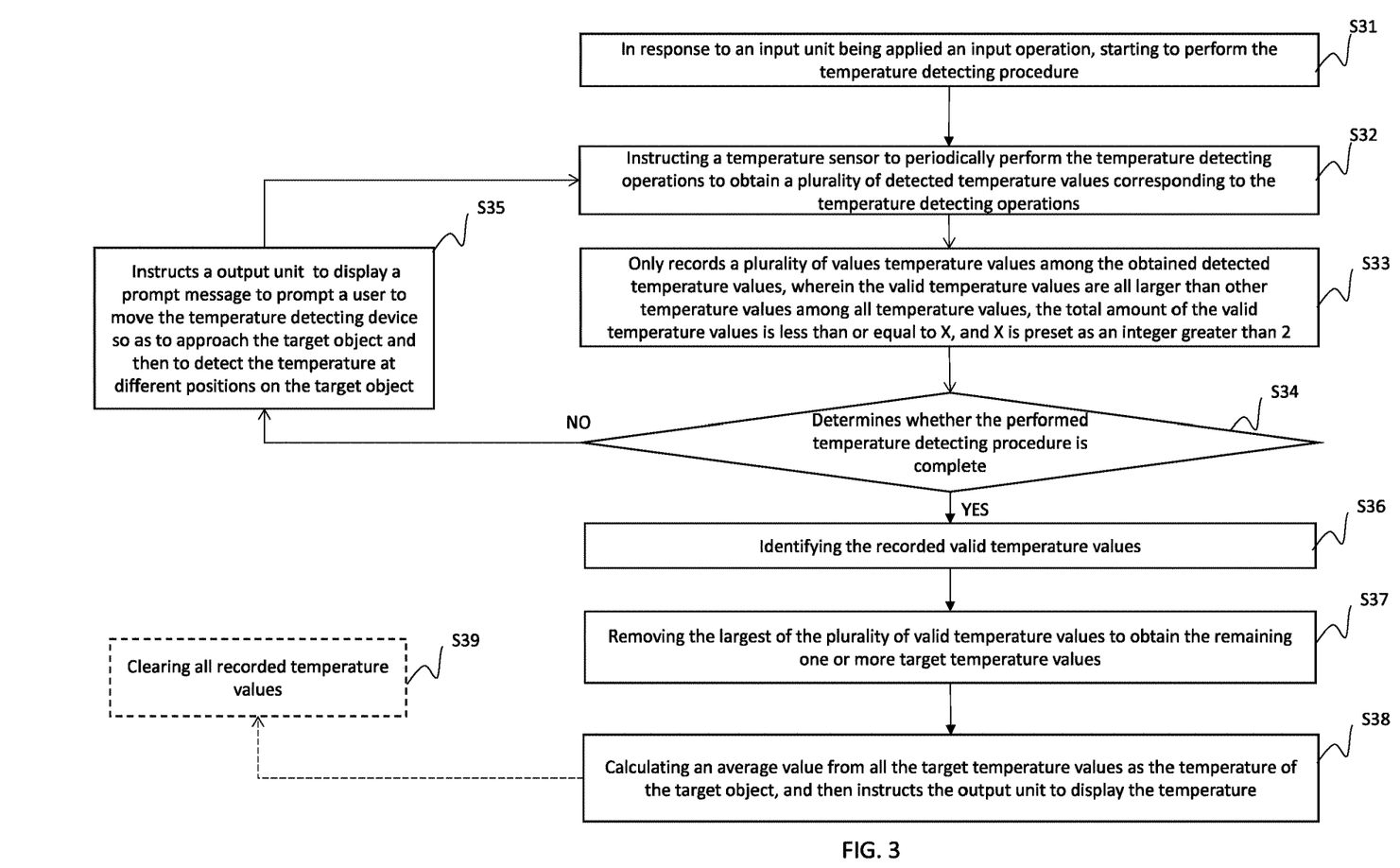
FIG. 3 is an operation flow chart of a temperature detecting device illustrated according to an embodiment of the invention.

To illustrate the operation process and function of the temperature detecting device of the invention, please refer to FIG. 3 and the corresponding paragraph.

FIG. 3 is an operation flow chart of a temperature detecting device shown according to an embodiment of the invention. Refer to FIG. 3, in step S31, in response to the input unit 130 being applied an input operation, the control unit 110 starts to perform the temperature detecting procedure. For example, as described above, in response to the first button 130(1) being pressed (input operation), the control unit 110 starts to perform the temperature detecting procedure (e.g., steps S32, S33, S34).

Then, in step S32, the control unit 110 instructs the temperature sensor 120 to periodically perform the temperature detecting operations to obtain a plurality of detected temperature values corresponding to the temperature detecting operations. Specifically, in step S32, temperature sensor 120 will start to periodically (e.g., with each scheduled time interval) to collect infrared energy over a period of time to convert/calculate the collected infrared energy to a corresponding temperature value, and the temperature value is transferred back to the control unit 110, such that the control unit may obtain the detected temperature value. In one embodiment, the control unit 110 may temporarily store a detected temperature value in a memory of a temperature detecting device 10.

Next, in step S33, the control unit 110 only records a plurality of values temperature values among the obtained detected temperature values, wherein the valid temperature values are all larger than other temperature values among all temperature values, the total amount of the valid temperature values is less than or equal to X, and X is predetermined as an integer greater than 2. Specifically, the control unit 110 may record only the first X largest temperature values (i.e., the valid temperature values) among all the obtained detected temperature values.

Specifically, in the operation of only recording the valid temperature values of the obtained detected temperature values, each time when the control unit 110 obtains one detected temperature value, the control unit 110 updates the recorded valid temperature values by comparing the one detected temperature value with the recorded valid temperature values.

More detailed, in the operation of updating the recorded valid temperature values by comparing the one detected temperature value with the recorded valid temperature values, in response to determining that the total amount of the plurality of valid temperature values is smaller than X, the control unit directly records the one detected temperature value as one of the valid temperature values to update the plurality of valid temperature values.

On the other hand, in response to determining that the total amount of the plurality of valid temperature values is equal to X, the control unit 110 determines whether the one detected temperature value is greater than one of the valid temperature values. In response to determining that the one detected temperature value is greater than the one of the valid temperature values, the control unit 110 removes a minimum among the valid temperature values and records the one detected temperature value as one of the valid temperature values, so as to update the valid temperature values, wherein X indicates a upper limit value of the total amount of the plurality of valid temperature values, and the plurality of valid temperature values indicates the first X largest detected temperature values among all the detected temperature value. In addition, in response to determining that the one detected temperature value is not greater than one of the valid temperature values (e.g., the one detected temperature value is not greater than all the valid temperature values), the control unit 110 does not record the one detected temperature value as one of the valid temperature values (e.g., the valid temperature values are not updated).

In other words, whenever a detected temperature value is obtained, when the control unit 110 determines that the total amount of all valid temperature values has not reached X, the control unit 110 will directly take the obtained temperature value as the valid temperature value; when the control unit 110 determines that the total amount of all of the valid temperature values has reached X, the control unit 110, by determining that the obtained one detected temperature value is greater than at least one of the current valid temperature values, take the obtained one detected temperature values as a new valid temperature value to replace the minimum one of the valid temperature values. In other words, X may be used to indicate the upper limit of the total amount of the plurality of valid temperature values, and that the plurality of valid temperature values are used to indicate the first X largest temperature values among all the detected temperature values.

Next, in step S34, the control unit 110 determines whether the performed temperature detecting procedure is complete. In the embodiment, the control unit 110 determines whether the total amount of the detected temperature values is smaller than N, wherein N is predetermined to be a positive integer greater than or equal to X. In response to determining that the total amount of the plurality of detected temperature values is not smaller than N, the control unit 110 determines that the performed temperature detecting procedure has been completed; in response to determining that the total amount of the plurality of detected temperature values is smaller than N, the control unit 110 determines that the performed temperature detecting procedure has not been completed.

In another embodiment, in response to the input unit 130 receiving another input operation (for example, the second key 130(2) is pressed), the control unit 110 determines that the performed temperature detecting procedure has been completed.

In a further embodiment, during the period in which the firs button 130(1) is pressed continuously, the temperature detecting procedure will be determined as not completed, and in response to determining the first button 130 (1) is change to an unpressed state from the press state (e.g., the fingers which is pressed the firs button 130(1) is away), the control unit 110 determines that the temperature detecting procedure is completed. In other words, in step S34, the control unit 110 determines whether the input operation (the pressing operation applied on the first button 130(1)) is stopped, wherein in response to determining that the input operation is stopped, the control unit 110 determines that the performed temperature detecting procedure has been completed; in response to determining that the input operation is not stopped, the control unit 110 determines that the performed temperature detecting procedure has not been completed. Furthermore, in another embodiment, the temperature sensor 120 may get a detected temperature value every P second, where P is, for example, 0.04. P can also be set to be a value greater than or less than 0.04.

It should be noted that in response to determining that the temperature detecting procedure has been completed and the total amount of the valid temperature value is 2, the control unit 110 directly records a smaller one among these valid temperature values, and instructs the output unit 140 shows that temperature (i.e., ignore the larger temperature).

It should be mentioned that, in an embodiment, the control unit 110 may instruct the output unit 140 to emit sound (the output unit 140 may also have a speaker) in response to the completion of the temperature detecting procedure executed by the control unit 110, so as to indicate the user that the temperature detecting procedure has been completed.

In response to determining that the temperature detecting procedure has been completed (S34→yes), execute step S36; in response to determining that the temperature detecting procedure has not been completed (S34→No), execute step S35.

In step S35, in response to determining that the temperature detecting procedure has not been completed, the control unit 110 instructs the output unit 140 to display a prompt message to prompt the user to move the temperature detecting device 10 so as to approach the target object and then to detect the temperature at different positions on the target object. Next, the flow continues to step S32 to perform the temperature detecting operation continuously. In another embodiment, the prompt message may also be used to instruct the user to keep the temperature detecting device 10 close to the target object (the temperature detecting procedure has not been completed).

In step S36, the control unit 110 identifies the recorded valid temperature values. In addition, in this step, the control unit 110 can also sort the recorded plurality of valid temperature values from largest to smallest.

Next, in step S37, the control unit 110 removes the largest of the plurality of valid temperature values to obtain the remaining one or more target temperature values. For example, the control unit 110 may remove the most front valid temperature value from the sorted valid temperature values and obtain the remaining plurality of valid temperature values (also known as plurality of target temperature values).

It should be noted that in one embodiment, the control unit 110 may remove the last valid temperature value from the sorted valid temperature values and obtain the remaining one or more valid temperature values (also known as plurality of target temperature values).

That is, the control unit 110 may remove the largest or smallest extreme valid temperature value from the recorded plurality of valid temperature values to obtain the remaining one or more target temperature values. In one embodiment, before removing the largest or smallest valid temperature value, the control unit 110 may determine a difference between the first front one and the second front one or a further difference between the first last one and the second last one is greater than an extreme threshold, to confirm whether to remove the largest or smallest (for example, if the difference is greater than the extreme threshold, it is confirmed that the corresponding largest/smallest valid temperature value should be removed).

Next, in step S38, the control unit 110 calculates an average value from all the target temperature values as the temperature of the target object, and then instructs the output unit 140 to display the temperature. Specifically, In the embodiment, the control unit 110 calculates the average of all target temperature values (e.g., the arithmetic mean) and takes the calculated arithmetic mean as the temperature of the target object. If there is only one target temperature value, the control unit 110 directly takes the target temperature value as the temperature of the target object.

In another embodiment, the control unit 110 calculates the average of the largest and the next largest of the one or more target temperature values to take the said temperature of the target object.

In addition, the control unit 110 can display the temperature of the target object through the output unit 140 (for example, the numerical value of the temperature of the target object is displayed on the liquid crystal screen).

In one embodiment, after the temperature of the target object is obtained (or after the temperature is displayed in the output unit 140), all recorded temperature values are cleared by the control unit 110 in step S39. In this way, the new temperature detecting procedure may avoid the influence of the old recorded temperature values in the old temperature detecting procedure.

Based on the above, the temperature detecting device provided by the implement of the invention, is capable of, via a plurality of performed temperature detecting operations performed on a target object, obtaining a plurality of detected temperature values and recording a plurality of larger valid temperature values therein, removing the largest among the valid temperature values, and calculating an average of the remaining a plurality of target temperature values to be a temperature of the target object. In this way, the distortion caused by the extreme detected temperature values can be avoided, and then the accuracy of the obtained temperature of the target object is thus improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A temperature detecting device for measuring a temperature of a target object, comprising:
   a temperature sensor;
   an input unit;
   an output unit; and
   a control unit,
   wherein, in response to an input operation being applied on the input unit, the control unit starts to perform a temperature detecting procedure,
   wherein the control unit instructs the temperature sensor to periodically perform a plurality of temperature detecting operations to obtain a plurality of detected temperature values corresponding to the plurality of temperature detecting operations,
   wherein the control unit only records a plurality of valid temperature values among the plurality of detected temperature values obtained, wherein the valid temperature values are larger than other temperature values in the plurality of detected temperature values obtained, wherein a total amount of the plurality of valid temperature values is less than or equal to X, wherein X is predetermined as an integer greater than 2,
   wherein the control unit determines whether the temperature detecting procedure is completed,
   wherein, in response to determining that the temperature detecting procedure has been completed, the control unit identifies the plurality of valid temperature values being recorded,
   wherein the control unit removes a largest value of the plurality of valid temperature values being recorded to obtain remaining one or more target temperature values, and
   wherein the control unit calculates an average value according to the remaining one or more target temperature values to serve as the temperature of the target object, and instructs the output unit to display the temperature.

2. The temperature detecting device as claimed in claim 1, wherein, in the operation of the determining whether the temperature detecting procedure is completed, the control unit determines whether a total amount of the plurality of the detected temperature values is smaller than N, wherein N is predetermined as a positive integer greater than or equal to X,
   wherein, in response to determining that the total amount of the detected temperature values is not smaller than N, the control unit determines that the temperature detecting procedure being performed has been completed,
   wherein, in response to determining that the total amount of the detected temperature values is smaller than N, the control unit determines that the temperature detecting procedure being performed has not been completed or the control unit determines whether the input operation is stopped,
   wherein, in response to determining that the input operation is stopped, the control unit determines that the temperature detecting procedure being performed has been completed and,
   wherein, in response to determining that the input operation is not stopped, the control unit determines that the temperature detecting procedure being performed has not been completed.

3. The temperature detecting device as claimed in claim 1, wherein, in the operation of determining whether the temperature detecting procedure being performed is completed, the control unit determines that the temperature detecting procedure has been completed in response to the input unit receiving another input operation.

4. The temperature detecting device as claimed in claim 3, wherein, in response to determining that the temperature detecting procedure being performed has been completed and the total amount of the plurality of valid temperature values is equal to 2, the control unit directly takes a smaller valid temperature value among the plurality of valid temperature values that have been recorded as the temperature of the target object and instructs the output unit to display the temperature.

5. A temperature detecting device as claimed in claim 1, wherein, in response to determining that the temperature detecting procedure is not completed, the control unit instructs the output unit to display a prompt message to prompt a user to move the temperature detecting device closer to the target object, and then measure the temperature at different positions on the target object.

6. The temperature detecting device as claimed in claim 5, wherein the temperature sensor is an infrared temperature sensor.

7. The temperature detecting device as claimed in claim 6, wherein the control unit empties all of the plurality of valid temperature values being recorded after displaying the temperature.

8. The temperature detecting device as claimed in claim 1, wherein, in the operation of only recording the valid temperature values of the detected temperature values obtained, each time when the control unit obtains one detected temperature value of the plurality of detected temperature values, the control unit updates the plurality of valid temperature values being recorded by comparing the one detected temperature value with the plurality of valid temperature values being recorded.

9. The temperature detecting device as claimed in claim 8, wherein, in response to determining that the total amount of the plurality of valid temperature values is less than X, the control unit directly records the one detected temperature value as one of the plurality of valid temperature values to update the plurality of valid temperature values;
   wherein, in response to determining that the total amount of the plurality of valid temperature values is equal to X, the control unit determines whether the one detected temperature value is greater than one of the plurality of valid temperature values,
   wherein, in response to determining that the one detected temperature value is greater than the one of the plurality of valid temperature values, the control unit removes a minimum among the plurality of valid temperature values and records the one detected temperature value as one of the plurality of valid temperature values, so as to update the plurality of valid temperature values, and wherein X indicates an upper limit value of the total amount of the plurality of valid temperature values, and the plurality of valid temperature values indicates first X largest detected temperature values among all of the plurality of detected temperature values.

10. The temperature detecting device as claimed in claim 9, wherein, in response to determining that the one detected temperature value is not greater than all of the plurality of valid temperature values, the control unit does not record the one detected temperature value.

* * * * *